(12) United States Patent
Pozsgay et al.

(10) Patent No.: US 6,928,372 B2
(45) Date of Patent: Aug. 9, 2005

(54) METHOD FOR ESTIMATING TIME TO FULL-CHARGE IN A RECHARGEABLE BATTERY

(75) Inventors: Brian T. Pozsgay, Lawrenceville, GA (US); William C. Bohne, Lawrenceville, GA (US); Daniel J. Jakl, Lawrenceville, GA (US); Bradley E. Long, Lawrenceville, GA (US)

(73) Assignee: Motorola, Inc., Schaumburg, IL (US)

( * ) Notice: Subject to any disclaimer, the term of this patent is extended or adjusted under 35 U.S.C. 154(b) by 78 days.

(21) Appl. No.: 10/628,609

(22) Filed: Jul. 29, 2003

(65) Prior Publication Data

US 2005/0027465 A1 Feb. 3, 2005

(51) Int. Cl.⁷ .............................................. G01R 31/36
(52) U.S. Cl. ......................... 702/63; 320/132; 320/134; 320/137; 320/160
(58) Field of Search ........................ 702/63; 320/106, 320/132, 134, 137, 160; 324/426, 427

(56) References Cited

U.S. PATENT DOCUMENTS

| | | | |
|---|---|---|---|
| 4,709,202 A | | 11/1987 | Koenck et al. |
| 4,918,368 A | | 4/1990 | Baker et al. |
| 5,541,489 A | * | 7/1996 | Dunstan ..................... 320/134 |
| 5,565,759 A | | 10/1996 | Dunstan |
| 5,572,110 A | | 11/1996 | Dunstan |
| 5,600,230 A | * | 2/1997 | Dunstan ................. 340/636.13 |
| 5,751,134 A | * | 5/1998 | Hoerner et al. ............. 320/124 |
| 5,895,440 A | * | 4/1999 | Proctor et al. ................ 702/63 |
| 5,926,007 A | * | 7/1999 | Okada ......................... 320/132 |
| 5,982,147 A | * | 11/1999 | Anderson .................... 320/132 |
| 6,025,695 A | * | 2/2000 | Friel et al. ................... 320/106 |
| 6,078,871 A | | 6/2000 | Anderson |
| 6,246,890 B1 | * | 6/2001 | Sato et al. ................... 455/573 |
| 6,316,916 B2 | * | 11/2001 | Bohne ......................... 320/150 |
| 6,456,037 B1 | * | 9/2002 | Jakl et al. ................... 320/106 |
| 6,483,274 B2 | | 11/2002 | Lee |

* cited by examiner

Primary Examiner—Patrick J. Assouad
(74) Attorney, Agent, or Firm—Philip H. Burrus, IV

(57) ABSTRACT

A method for determining time to completion is provided for a battery charging system. The system preferably includes a charger having a microprocessor and a battery with a memory. The memory includes information about the battery, including battery identifiers, charging states, charging procedures and charging termination information. The charger reads this battery and then determines the charging states associated with the battery. The charger then determines the present state of charge, and calculates a time to completion for that state. The charger then determines times to completion for the remaining charge states, optionally compensating for self discharge within the battery. A total time to completion is determined by summing the times to completion for the respective charging states.

6 Claims, 3 Drawing Sheets

METHOD FOR ESTIMATING TIME TO FULL-CHARGE IN A RECHARGEABLE BATTERY

BACKGROUND

1. Technical Field

This invention relates generally to fuel gauging for rechargeable battery packs, and more specifically to a method for estimating the time remaining until a rechargeable battery pack is fully charged.

2. Background Art

Many portable electronic devices, like cellular telephones, laptop computers, pagers, radios and personal digital assistants (PDAs), rely upon rechargeable batteries for their portability. These batteries provide energy while on the go, but must be recharged once the energy is depleted.

Some electronic devices include fuel gauging circuits that attempt to display the amount of energy stored within the battery. For example, some devices include a display with a little picture of a battery on the screen. As the rechargeable battery stores energy, the battery picture slowly changes from transparent to colored. By looking at the amount of the battery picture that is colored, a user may roughly estimate how much energy is stored within the battery.

The problem with these systems occurs during charging. By looking at a graphical fuel gauge, a user can not tell how much longer it will be before the battery is fully charged. Imagine a police officer who wants to take a fully charged radio out on the beat. If he looks at a graphical fuel gauge and sees that his battery is roughly three-quarters charged, what does this tell him about how much longer will it be before the battery is fully charged? Will it be another 20 minutes? 30 minutes? The answer is that he can not tell based upon presently stored energy alone.

There is thus a need for an improved fuel gauge that tells a user how much time is remaining until a rechargeable battery is fully charged.

DETAILED DESCRIPTION OF THE INVENTION

Figure 1:
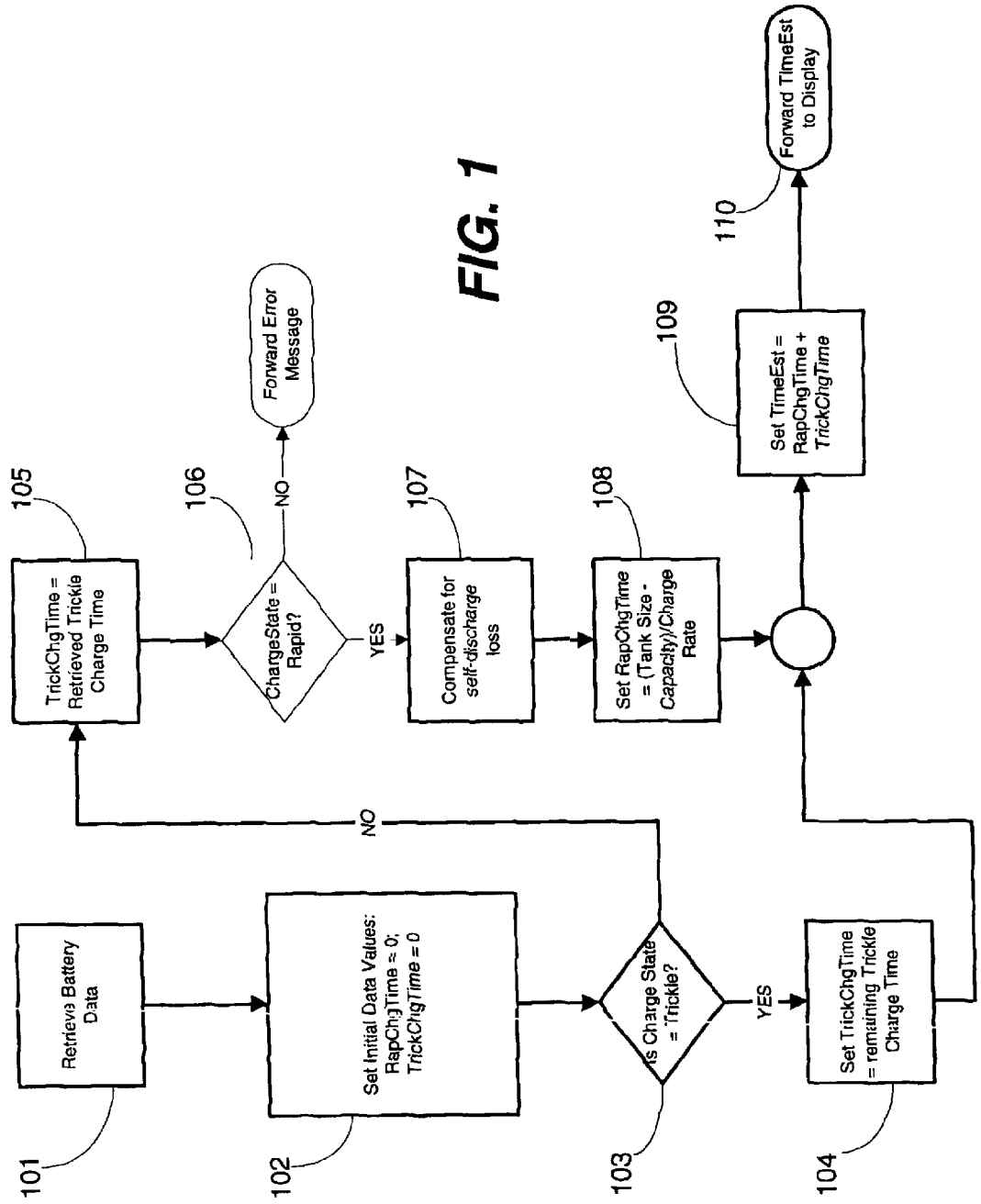
FIG. 1 illustrates a preferred method for estimating time to completion in accordance with the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

A method of determining the time until completion for a rechargeable battery is provided. "Time to completion" refers to the amount of time remaining until a rechargeable battery is fully charged. For example, if a 25% charged battery were connected to a charger, and it would take 60 minutes until the battery reached 100% charge, the time to completion would be 60 minutes. The method offers distinct advantage in that a person who may be leaving on a long trip our outing will know exactly when the battery will be fully charged so as to better plan his departure time.

Figure 3:
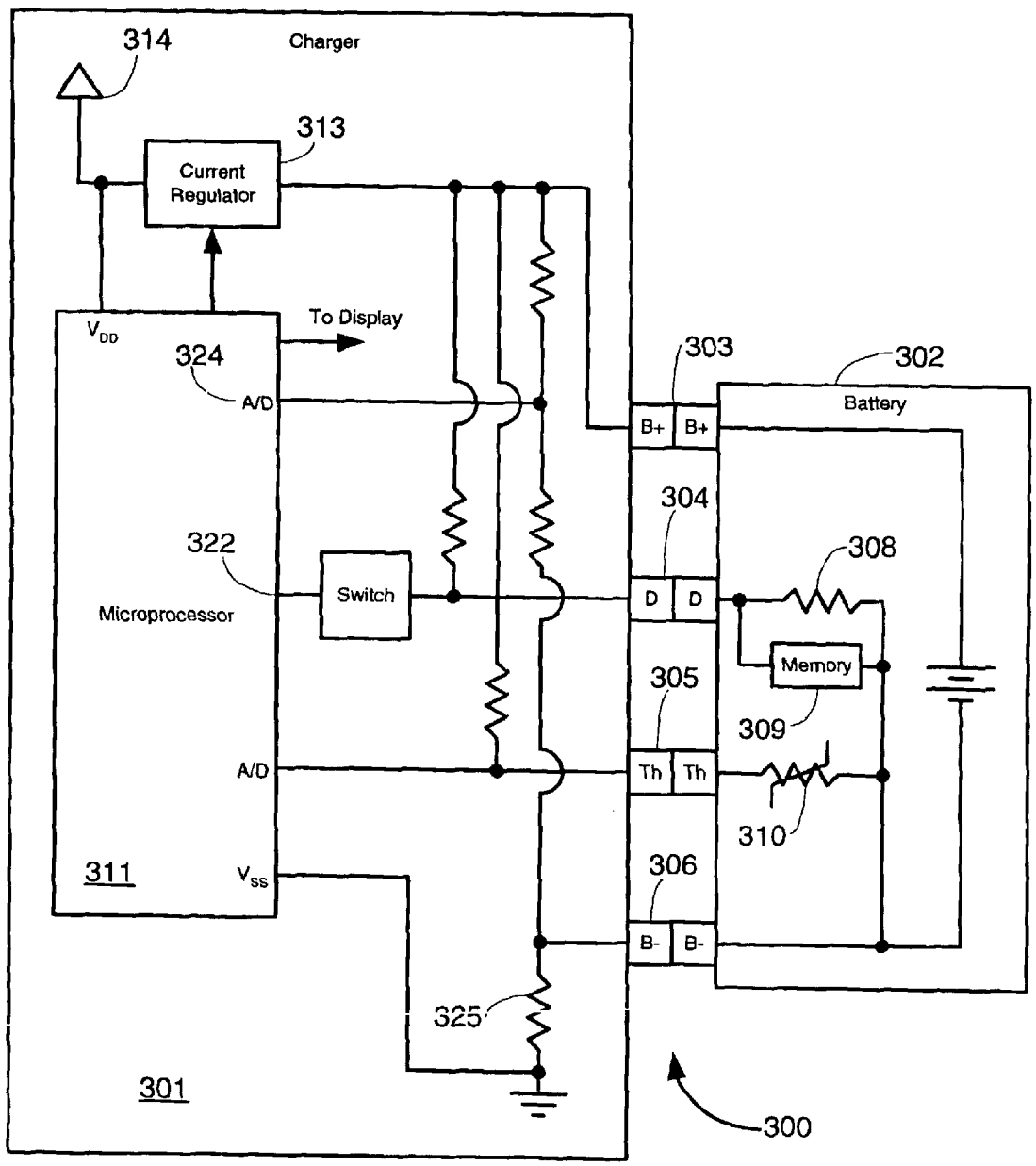
FIG. 3 illustrates an exemplary apparatus for employing the methods of FIGS. 1 and 2.

Referring first to FIG. 3, illustrated therein is a schematic block diagram of one preferred hardware architecture upon which the method may be implemented in accordance with the invention. The system 300 includes a charger 301 having a power supply 314 and a current regulator 313. Any number of charging circuits known in the art, including buck regulators, linear regulators, flyback regulators, boost regulators, or equivalent may suffice as the current regulator 313. The charger 301 may optionally include indicators, like light emitting diodes for example, to indicate the present state of charge.

The charger 301 includes a microprocessor 311 and a voltage reference. The microprocessor 311 preferably includes on-board random-access memory, RAM, although peripheral memory would also suffice. The microprocessor 311 preferably includes communication ports 322 and analog-to-digital, A/D, converters 324. One example of a microprocessor suited for this application is the uPD78F0034 series manufactured by NEC. This is an 8-bit microprocessor with 32 Kbytes of on-board flash memory and 1024 bytes of high-speed on-board RAM.

The charger 301 includes several contacts for coupling to a battery. Typically, four contacts would be provided: a B+ contact 303 for supplying power to the battery, a B− contact 306 that serves as a return path, a Th contact 305 for sensing temperature, and a D contact 304 for identifying the battery. Temperature sensing may be done with a thermistor 310 disposed within the battery pack 302. Identification may be done via either a coding resistor 308 or a memory device 309 with data stored therein. The charger 301 further includes a means of sensing current. One preferred means of sensing current is by way of a current sense resistor 325 coupled to an A/D converter 324.

The battery pack 302 contains the thermistor 310 for sensing the temperature of the cell(s) 307, the optional code resistor 308, which has an impedance that corresponds to a particular cell, and a memory device 309 that holds battery information, including serial number, type of cell, charging instructions, charge usage histogram, date of manufacture, first date of use, last time of charge, charge capacity, current charge level, and similar information. An example of such a memory device is the DS2400 and DS2500 series (e.g., the DS2433) manufactured by Dallas Semiconductor. Batteries of this construction are also taught in application Ser. No. 09/738,090, filed Dec. 15, 2000, entitled "Method and Mechanism to Prevent Corruption of Data", U.S. Pat. No. 6,316,916, which is incorporated herein by reference in its entirety for all purposes.

Referring now to FIG. 1, illustrated therein is one preferred embodiment of method of determining the time until completion for a rechargeable battery in accordance with the invention. Data from the memory 309 disposed within the battery 302 is retrieved at step 101. This data may include battery identification information, charging information, charging states, default times for completion of the charging states, and the like.

The microprocessor 311 within the charger 301 then sets initial data values for the charging states at step 102. In this exemplary embodiment, the primary states are rapid charge, wherein the battery is being charged at a high current, and trickle charge wherein the battery has reached near full capacity and the current has been reduced to a low level for top-off charging. The values for these states are initialized at step 102.

The charger 301 then determines the present state of charge at step 103. The state of charge is a function of capacity, and may be read from the memory 309 in the battery 302, read from a fuel gauging circuit or sensed by battery voltage, temperature or charging current. If the battery 302 is near full capacity, and the charging state is thus trickle charge, then the charger 301 will set the trickle charge in one of two ways: if the transition from rapid to trickle charging was captured by the charger 301, then the charger 301 will set the trickle charge time variable equal to the default trickle charge time retrieved from the battery 302 less the time elapsed since the transition from rapid to trickle. If the transition from rapid to trickle was not captured, then the trickle time variable will be set to the default trickle charge time retrieved from the battery 302, as it is in step 105. If the present state is rapid charge (step 106), then the charger 301 may optionally compensate for self discharge loss at step 107. This may be accomplished when the data stored within the battery 302 includes a time stamp, and when the battery includes a real time clock. The charger 301 reads the capacity, time stamp of last charge, default parasitic loss value(s), and current time from the battery 302. The capacity, which represents the amount of energy stored within the battery, is then compensated by subtracting the product of elapsed time and default parasitic loss value(s) from the read capacity.

The rapid charge time is then set at step 108. This is done by first reading the tank size from the battery 301. The tank size is the maximum energy capable of being stored within the battery 302. The maximum energy capable of being stored may be based upon a factory calibration, as any one particular cell may be slightly different from another due to tolerances, storage conditions, time since manufacture, etc. The current charge level is then read from the battery. The charger 301 then subtracts the current charge level from the tank size. The result is then divided by the charging current. This yields a time to completion for the rapid charge state. The trickle charge time is then added to yield a total time to completion at step 109. This value is forwarded to a display at step 10.

To summarize, a charger is provided. The charger is capable of coupling to a rechargeable battery. The charger includes a processor that is capable of identifying the battery. The charger then identifies the charging states for that particular battery. In the exemplary embodiment above, the charging states were rapid and trickle, although the invention is not so limited. Numerous other charging states, including an initiation charge for batteries that are below their recommended minimum threshold voltages, may be included.

The charger then determines which state is being executed. The charger calculates a first time to completion for that particular state. The charger also calculates at least a second time to completion for another of the states. The first and second (as well as others if applicable) are summed to determine a total time of completion.

Figure 2:
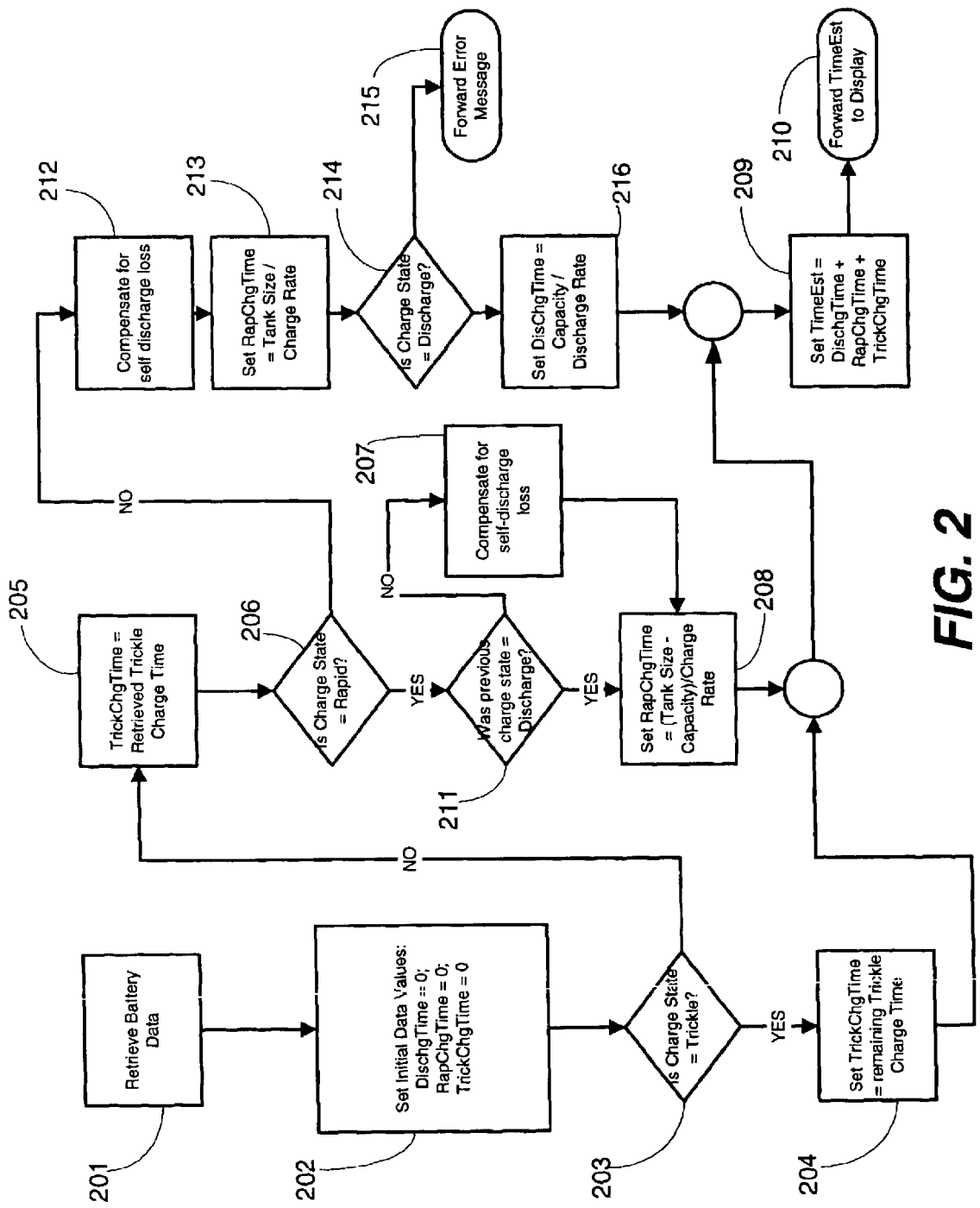
FIG. 2 illustrates a preferred method for estimating time to completion in accordance with the invention.

Referring now to FIG. 2, illustrated therein is a second preferred embodiment of determining a time to completion in accordance with the invention. The method of FIG. 2 is similar to that of FIG. 1, except a third charging state—discharging—is included. Steps 201–210 are analogous to steps 101–110 of FIG. 1.

The difference occurs at step 206. If the charging state is not rapid, the charger 301 optionally compensates for self-discharge loss at step 212. The charger 301 then sets the rapid charging time to the tank size divided by the rapid charge current. This is done because the charger 301 knows that the battery 302 will be fully discharged at the completion of the discharge step.

The charger 301 then verifies that the charging state is discharge at step 214. If the charging state is not one of the allowable charging states, an error message is delivered at step 215. If the charging state is discharge, the charger 301 calculates the discharge time by dividing the present battery charge level by the discharge current at step 216.

Revisiting step 206, when the charging state is rapid, the charger 301 detects whether a transition from discharge to rapid charge was stored in memory at step 211. If so, the charger 301 will skip the optional self discharge step 207. The rapid charge time is calculated at step 208. The total time to completion is computed at step 209 by adding the trickle charge time, the rapid charge time and the discharge time together.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims.

What is claimed is:

1. A method for determining a time until completion for a charging process associated with a rechargeable battery, the method comprising the steps of:
   a. providing a charger capable of coupling to the rechargeable battery, the charger comprising a means of processing data capable of identifying the rechargeable battery;
   b. identifying a charging process for the rechargeable battery, the process comprising a plurality of charging states;
   c. determining which of the plurality of charging states is being executed;
   d. calculating a first time to completion for the state being executed;
   e. calculating at least a second time to completion for at least one of the remaining states of the plurality of charging states; and
   f. calculating the time to completion for the charging process by adding the first and the at least a second time to completion;
   wherein each of the plurality of charging states is selected from the group consisting of trickle charging, rapid charging, initiation charging, and discharging;
   wherein calculating a time to completion for the rapid charging state comprises the steps of:
      i. subtracting an amount of energy stored in the rechargeable battery from a maximum energy capable of being stored within the rechargeable battery; and
      ii. dividing by a rapid charge rate.

2. The method of claim 1, wherein the plurality of charging states comprises trickle charging, rapid charging and discharging.

3. The method of claim 2, wherein the first time to completion comprises a predetermined estimate corresponding to the rechargeable battery.

4. A method for determining a time until completion for a charging process associated with a rechargeable battery, the method comprising the steps of:
   a. providing a charger capable of coupling to the rechargeable battery, the charger comprising a means of processing data capable of identifying the rechargeable battery;

b. identifying a charging process for the rechargeable battery, the process comprising a plurality of charging states;

c. determining which of the plurality of charging states is being executed;

d. calculating a first time to completion for the state being executed;

e. calculating at least a second time to completion for at least one of the remaining states of the plurality of charging states; and f. calculating the time to completion for the charging process by adding the first and the at least a second time to completion;

wherein each of the plurality of charging states is selected from the group consisting of trickle charging, rapid charging, initiation charging, and discharging;

wherein calculating a time to completion for the discharging state comprises the step of dividing a maximum energy capable of being stored within the rechargeable battery by a discharge rate.

5. The method of claim 1 or 4, further comprising the step of compensating for energy dissipated within the rechargeable battery pack due to self-discharge.

6. The method of claim 5, wherein compensating comprises:

a. reading a most recent battery usage time stored within the rechargeable battery;

b. determining a present time;

c. calculating an elapsed time;

d. dividing the elapsed time by a predetermined self-discharge rate;

subtracting a corresponding energy from an amount of energy stored within the rechargeable battery.

* * * * *